United States Patent [11] 3,526,216

[72] Inventor Jean Fernand Emile Ghislain Henvaux
 27, Rue des Melezes, Brussels V, Belgium
[21] Appl. No. 736,141
[22] Filed June 11, 1968
[45] Patented Sept. 1, 1970
[32] Priority June 14, 1967
[33] Belgium
[31] No. 699,896

[54] TIMING SYSTEM FOR ENGINES
 6 Claims, 24 Drawing Figs.
[52] U.S. Cl.................................................. 123/190,
 123/80
[51] Int. Cl..................................................... F01l 7/02
[50] Field of Search........................................ 123/190B,
 190B2, 80, 80B1, 190B1, 190A, 190B2T,
 190B3, 190B3T, 190B4, 190D1, 80B2, 80D1

[56] References Cited
 UNITED STATES PATENTS
 1,005,969 10/1911 Heaton.................... 123/190(B2)UX
 1,104,075 7/1914 Shaw......................... 123/80(B1)UX
 1,107,274 8/1914 Elliot.......................... 123/80(B1)UX
 1,128,540 2/1915 Spiess......................... 123/80(B1)UX
 1,198,957 9/1916 Riley......................... 123/190(B2)UX
 1,307,186 6/1919 Davis......................... 123/190(B2)UX
 1,309,906 7/1919 Morse....................... 123/190(B2)UX
 3,133,530 5/1964 Goodheim.................. 123/190(D)UX
 FOREIGN PATENTS
 3,210 1915 Great Britain............ 123/190(B2)UX Primary Examiner—Mark M. Newman
Attorney—McGlew and Toren ABSTRACT: In a valveless timing system for combustion engines a timing shaft is positioned within a cylinder head and is provided with an intake port in axial spaced relationship to an exhaust port with both of the ports extending angularly about the periphery of a cylindrically shaped section of the shaft. The timing shaft is rotated intermittently by the combination of a plate member and a Maltese cross driving device arranged in operative engagement so that the plate member is driven by the drive shaft of the engine and, in turn, drives the Maltese cross driving device and the timing shaft. The part driven by the drive shaft of the engine rotates at the same speed as the drive shaft, and due to the arrangement of the plate member and the Maltese cross driving device the timing shaft rotates intermittently so that the intake port and exhaust port are moved alternately into and out of communication with the engine cylinder for conveying intake and exhaust through intake and exhaust pipes, respectively, in the cylinder head.

Patented Sept. 1, 1970 3,526,216
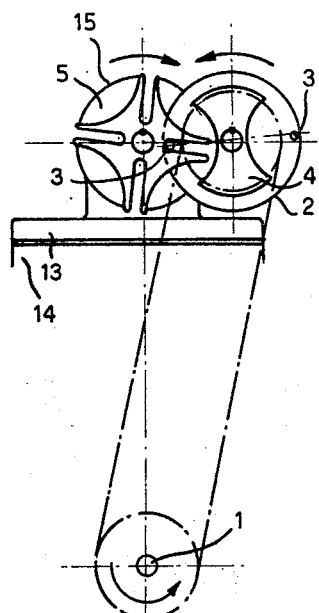
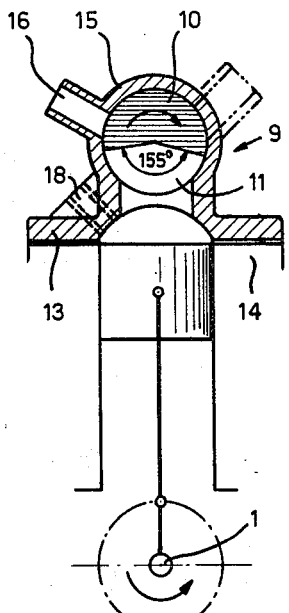
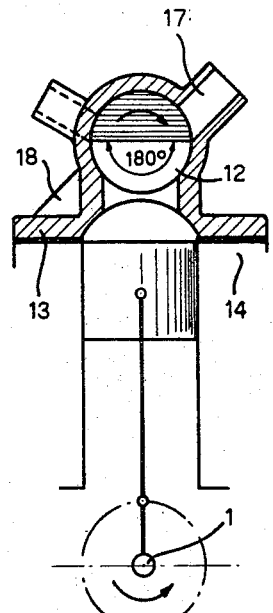
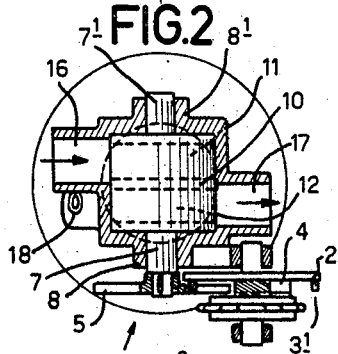
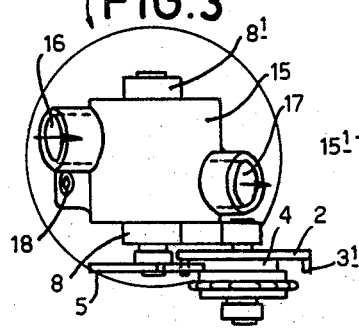
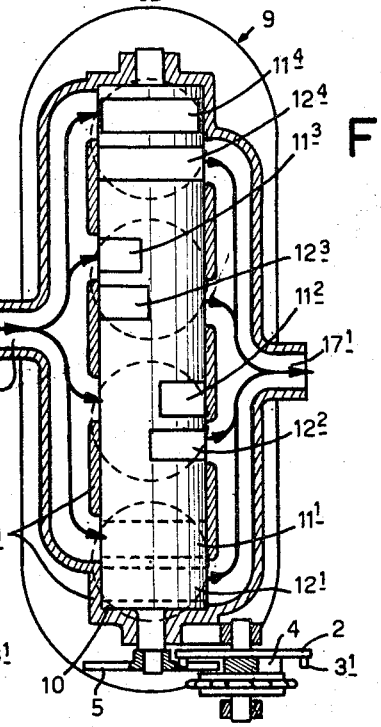
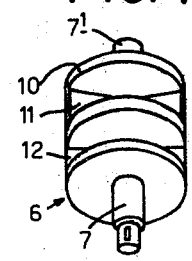
INVENTOR.
JEAN FERNAND EMILE GHISLAIN HENYAUX
BY
McGlew and Toren
ATTORNEYS

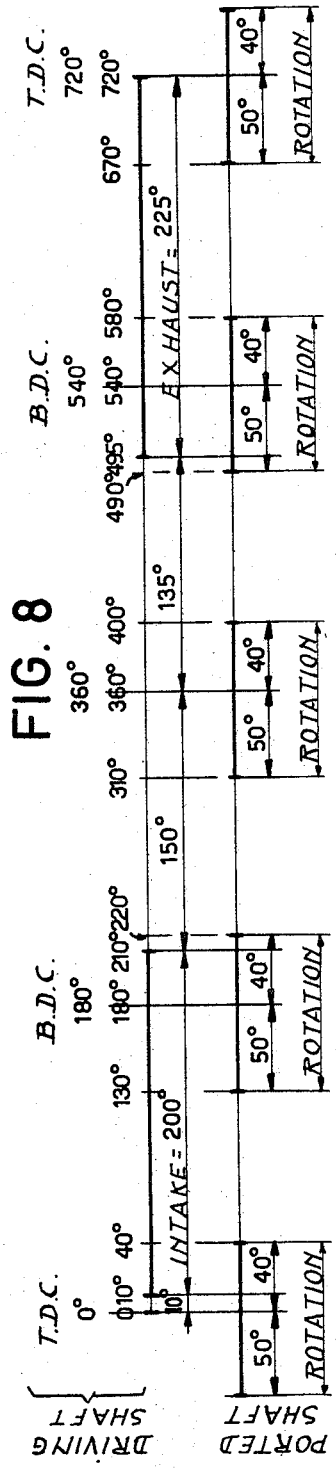
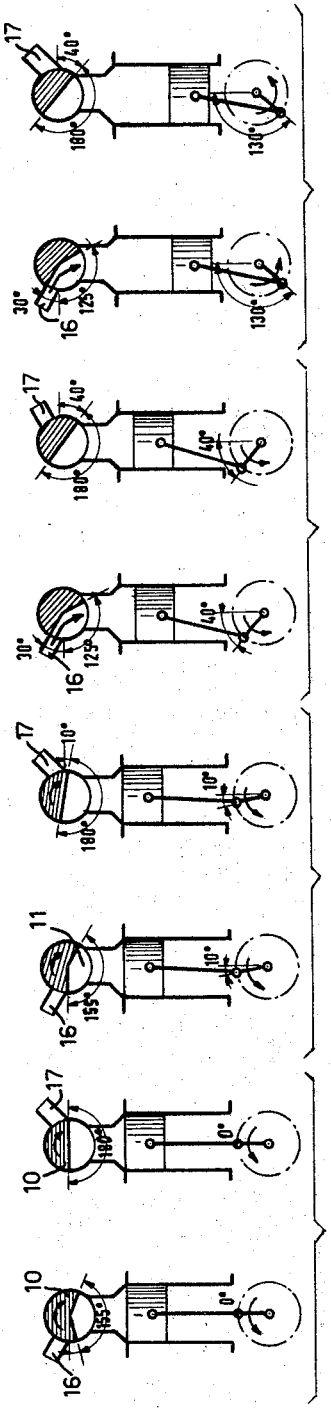

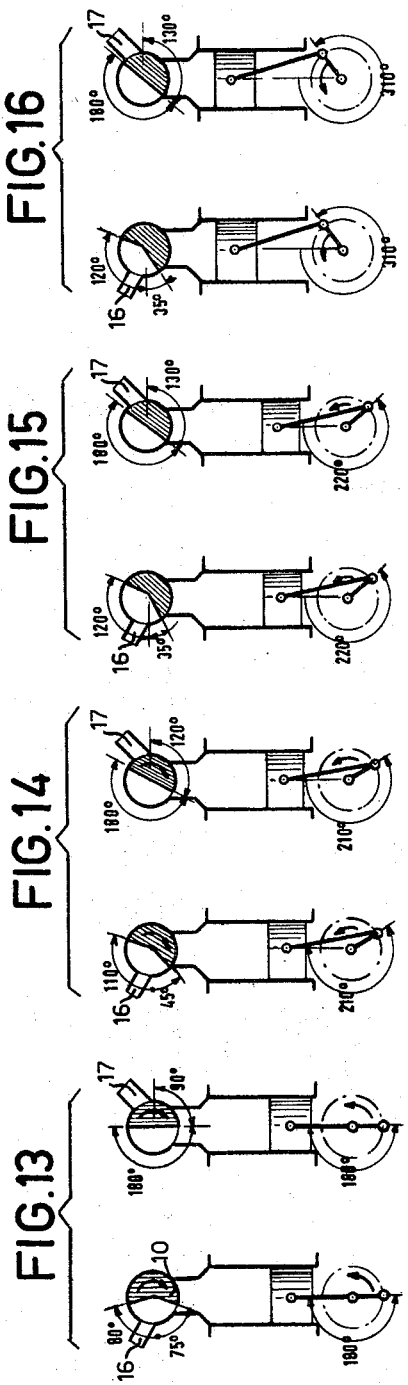
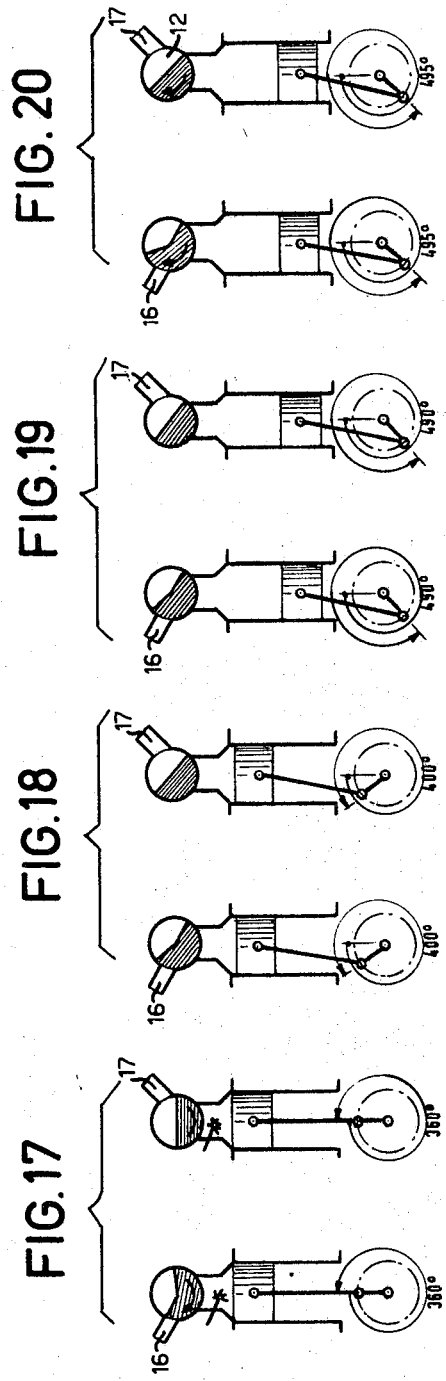

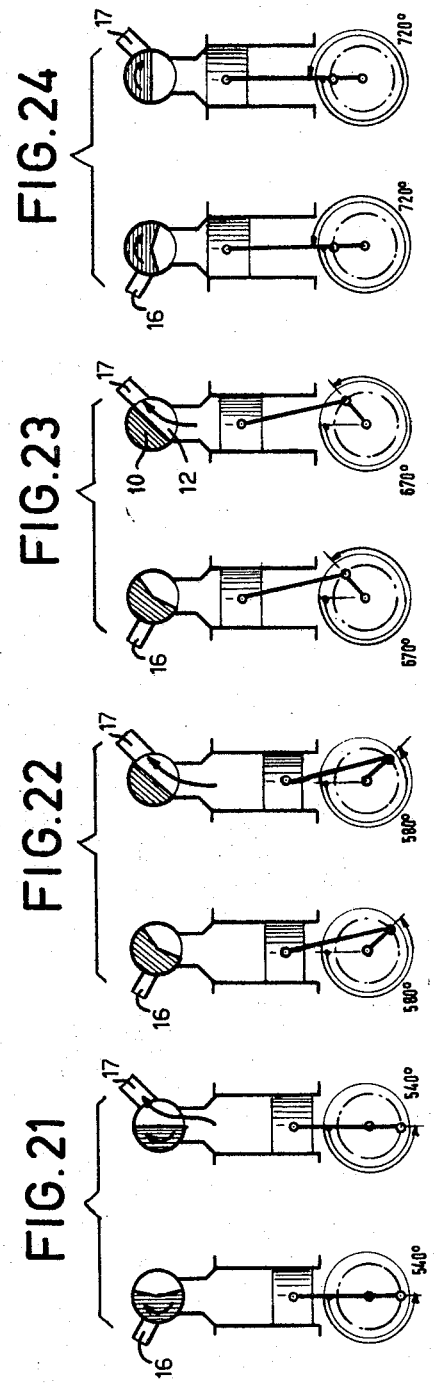

TIMING SYSTEM FOR ENGINES

My invention relates to an improved timing system for engines.

Valves and the means actuating them are a source of trouble in all engines, because they are often subject to annoying and expensive breakdowns.

Conventional internal combustion engines are provided with a valve system to open and close exhaust and inlet ports, these valves being operated by mechanism including tappets, push rods, rockers, return springs, etc.

An object of the invention is to devise a new timing system which is much simpler and is consequently much cheaper to manufacture than known systems.

According to the present invention therefore there is provided a timing system for an internal combustion engine wherein a cylinder head of a combustion cylinder has rotatably mounted therein a timing shaft formed with an inlet port and an exhaust port, the ported shaft being arranged to be driven by a Maltese cross driving device including a drive shaft, the continuous rotating motion of which produces intermittent rotation of the ported shaft.

If desired, the timing system may be applied to an engine cylinder operating on the four stroke cycle, the drive shaft carrying a drive wheel having two drive pins to engage the Maltese cross which has four drive slots, whereby the drive shaft, arranged to rotate at engine speed, rotates twice as fast as the Maltese cross which is rotatable with the ported shaft, the ported shaft having four dwell periods during each revolution thereof.

Advantageously, the cylinder head, the ported shaft and the Maltese cross may form a unit which is independent of the engine unit and is therefore readily interchangeable.

The invention will be more readily understood from the following non-limitative example which refers to a four-stroke internal combustion engine and is illustrated by the drawings, in which:

FIG. 1 is a view in elevation showing a Maltese cross actuating unit;

FIG. 2 is a horizontal section through the timing unit;

FIG. 3 is a plan view of the timing unit shown in FIG. 2;

FIG. 4 is a perspective view of a ported shaft;

FIG. 5 is a vertical section showing the position of the intake port in the ported shaft with respect to the intake pipe when the piston is at top dead centre;

FIG. 6 is a view similar to FIG. 5 but referring to the exhaust port and pipe;

FIG. 7 is a view corresponding to FIG. 2, except that the engine has four cylinders instead of one, as in FIG. 2;

FIG. 8 diagrammatically shows the periods of rotation and rest of the ported shaft with respect to the rotation of the driving shaft; and FIGS. 9 to 24 are sectional diagrams of the different positions of the intake and exhaust ports with respect to the intake and exhaust pipes for successive positions of the driving shaft (i.e. of the piston).

Driving shaft 1 transmits rotary movement, without stepping it down, to a circular plate 2, which comprises two lugs 3 and $3^1$ and a projection 4. The lugs 3 and $3^1$ of plate 2 in turn transmit the movement to a Maltese cross 5, the plate 2 and Maltese cross 5 together comprising a known Maltese cross driving system which converts continuous rotation of plate 2 into intermittent rotation of the cross 5. Since plate 2 has two lugs 3 and $3^1$, the cross 5 makes a quarter-turn when plate 2 makes a half-turn, and cross 5 thus rotates at half the speed of plate 2, i.e. at half the speed of driving shaft 1.

The Maltese cross 5 is integral with a ported shaft 6 (FIG. 4) comprising two spindles 7 and $7^1$ rotatable in bearings 8 and $8^1$ of cylinder head 9. The shaft 6 has a cylindrical part 10 formed with an intake port 11 which, in the example, has a sector shaped opening having an apex angle of 155° and an exhaust port 12 of similar shape but having an apex angle of 180°.

The angular opening of the intake and exhaust ports of the timing shaft is calculated in relation with the position of the intake and exhaust pipes of the cylinder head and in relation with the shape of the cylinder head combustion chamber.

Cylinder head 9 has a base 13 (FIG. 5) attached by bolts (not shown) to the top of cylinder 14, and a hollow cylindrical upper part 15 in which the cylindrical part 10 of ported shaft 6 turns. The part 15 has an intake pipe 16 extending approximately radially therefrom to connect the inside of the cylinder head and consequently the cylinder with the carburettor via the intake port 11. The part 15 also has an exhaust pipe 17 extending approximately radially therefrom so as to connect the inside of the cylinder head and consequently the cylinder with the atmosphere via exhaust port 12. An opening 18 for a sparking plug is provided extending into the combustion chamber. The cylinder head 15 is also provided with two bearings 8 and $8^1$ for the ported shaft 6 and a support (not shown) for the shaft bearings of plate 2.

FIG. 7 shows a timing system according to the invention for a four-cylinder engine. The cylindrical part 10 of ported shaft 6 comprises four intake ports $11^1$ to $11^4$ and four exhaust ports $12^1$ to $12^4$ arranged in accordance with the engine cycle for each cylinder. An intake manifold $16^1$ brings the mixture to cylinder head $15^1$ and an exhaust manifold $17^1$ evacuates the waste gas.

The ported shaft 6 is driven in the manner already described.

FIG. 8 is a diagram showing the relation between the cycle of the ported shaft driven by the Maltese cross and a complete theoretical cycle of a four-stroke engine. It will be seen that 720° of rotation of the driving shaft correspond to
$$4\times 90° = 360°$$
of rotation by the ported shaft.

According to the invention, the intake and exhaust phases begin and end when the ported shaft is rotating. This is the case in the diagram, FIG. 8, where the intake aperture begins 10° after the top dead centre (0° TDC); the intake is closed 30° after the bottom dead centre (180° BDC); the exhaust aperture begins 45° after the bottom dead centre (540° BDC) and exhaust closure coincides with the top dead centre (720° TDC).

FIG. 9 shows the respective positions of the intake and exhaust ports at the beginning of a cycle or when the driving shaft 1 is at an angle of 0°, i.e. at the top dead centre (TDC). As may be seen, the ported shaft is rotating and the intake 16 and exhaust 17 pipes of the cylinder head are blocked by the cylindrical part 10 of the ported shaft.

In FIG. 10 (driving shaft at 10°), the ported shaft is still rotating and the intake port 11 begins to open the cylinder head intake pipe 16. This is the beginning of the intake phase, which theoretically lasts for 200°.

In FIG. 11 (driving shaft at 40°), the ported shaft has stopped rotating (see diagram, FIG. 8). The intake port has completely uncovered the cylinder head intake pipe and the mixture is sucked into the cylinder by the piston.

In FIG. 12 (driving shaft at 130°), the ported shaft, which has not moved from its position in FIG. 11, begins a new quarter-turn rotation. The intake continues.

In FIG. 13 (driving shaft at 180° or BDC), the ported shaft is rotating and the clearance for mixture to enter the cylinder is reduced by the cylindrical part 10 of the ported shaft.

In FIG. 14 (driving shaft at 210°) the ported shaft continues to rotate. The mixture intake pipe is no longer connected to the cylinder. This is the end of the intake phase.

In FIG. 15 (driving shaft at 220°) the ported shaft actuated by the Maltese cross has finished its 90° rotation and the intake and exhaust pipes are closed. This is the beginning of the compression phase.

In FIG. 16 (driving shaft at 310°) the ported shaft begins a new 90° rotation which does not, however, have any effect on the intake of mixture or on the evacuation of waste gases.

In FIG. 17 (driving shaft at 360° or TDC) the ported shaft is rotating. The intake and exhaust pipes are still closed and the compression phase has finished. At this point, the explosion occurs.

In FIG. 18 (driving shaft at 400°) the ported shaft has finished rotating but the intake and exhaust pipes are still blocked. This is the expansion or working phase.

In FIG. 19 (driving shaft at 490°) the ported shaft begins a new 90° rotation while the expansion continues.

In FIG. 20 (driving shaft at 495°) the ported shaft is rotating and the exhaust port 12 begins to connect the cylinder with the cylinder head exhaust pipe 17. This is a stage towards opening the exhaust.

In FIG. 21 (driving shaft at 540° or BDC) the ported shaft is rotating, so that the exhaust port increases the size of the opening for waste gas passing to the exhaust pipe, although the gas is not yet being expelled by the rising piston. This is the beginning of the exhaust phase.

In FIG. 22 (driving shaft at 580°) the ported shaft has finished rotating and the clear space between the cylinder and the cylinder head exhaust pipe is at a maximum. The waste gases are expelled by the piston. This is the exhaust phase.

In FIG. 23 (driving shaft at 670°) the ported shaft begins a new 90° rotation; the exhaust port 12 rotates so that the exhaust pipe 17 is blocked by cylindrical part 10. This is a continuation of the exhaust phase.

In FIG. 24 (driving shaft at 720°; TDC), the ported shaft is rotating; the exhaust pipe is blocked and all the waste gas has been expelled since the piston has stopped rising. This is the end of the exhaust phase. The cylinder head intake pipe 16 is also blocked, but when the driving shaft has rotated 10°, a new engine cycle begins, initiating the intake phase (FIGS. 9 and 10).

I claim:

1. In a valveless timing system for combustion engines, the combustion engines comprising a drive shaft, and an engine cylinder head forming a chamber arranged to communicate with a cylinder in the engine, wherein the improvement comprises a timing shaft rotatedly mounted within said cylinder head, means operatively connected to said drive shaft for rotating said timing shaft, an intake pipe in said cylinder head, an exhaust pipe in said cylinder head, said timing shaft comprising a cylindrically shaped axially extending section positioned within the chamber formed by said cylinder head, an intake port formed in and extending angularly about a portion of the circular periphery of said section, an exhaust port spaced on the axis of said shaft from said intake port and formed in and extending angularly about the circular periphery of said section, said intake port and exhaust port being arranged to afford communication between said intake pipe and exhaust pipe in said cylinder head respectively and the cylinder as said timing shaft rotates, said means for rotating said timing shaft comprising a plate member and a Maltese cross driving device disposed in operative engagement, said Maltese cross driving device being arranged to drive said timing shaft and said plate member being arranged to be driven by said drive shaft at no reduction in speed and in turn to drive said Maltese cross driving device and said timing shaft, said Maltese cross driving device having angularly spaced recesses formed in the periphery thereof, and means on said plate member arranged to engage the recesses in the periphery of said Maltese cross driving device so that by the operative engagement of said plate member and Maltese cross driving device said timing shaft is rotated intermittently in response to the continuous rotation provided by said drive shaft whereby said intake port and exhaust port in said timing shaft are intermittently moved into and out of communication with the cylinder for effecting the intake and exhaust operations of the combustion engine.

2. In a valveless timing system, as set forth in claim 1, wherein means are arranged for driving said plate member from said drive shaft, and said Maltese cross driving device being mounted on said timing shaft.

3. In a valveless timing system, as set forth in claim 2, wherein said timing shaft comprises a pair of axially extending spindles, bearing means in said cylinder head for rotatably supporting said spindles, and said cylindrically shaped section of said timing shaft being mounted on said spindles for rotation within the chamber formed by said cylinder head.

4. In a valveless timing system, as set forth in claim 2, wherein the combustion engine comprising a plurality of cylinders with each of said cylinders communicating with said cylinder head, said timing shaft extending through said cylinder head and having one said intake port and one said exhaust port for each said cylinder in the engine.

5. In a valveless timing system, as set forth in claim 2, wherein said cylinder head comprising a base arranged to be secured to an engine unit, a hollow cylindrical part mounted on said base and forming the chamber in which said timing shaft rotates, said intake pipe being secured to and extending radially outwardly from said hollow part, said exhaust tube being secured to and extending radially outwardly from said hollow part, and end means on said hollow part for supporting said timing shaft.

6. In a valveless timing system, as set forth in claim 5, wherein said plate member comprises a circular plate, a pair of diametrically opposed lugs mounted on said circular plate adjacent the periphery thereof, the recesses in said Maltese cross driving device being formed by radially arranged slots disposed between the arms of said Maltese cross driving device so that as said circular plate member rotates, being driven by and at the speed of said drive shaft, for each half rotation of said plate member one of said lugs thereof engages one of the slots in said driving device for effecting an intermittent rotation of said timing shaft.